US007676754B2

(12) United States Patent
Basson et al.

(10) Patent No.: US 7,676,754 B2
(45) Date of Patent: Mar. 9, 2010

(54) METHOD AND PROGRAM PRODUCT FOR RESOLVING AMBIGUITIES THROUGH FADING MARKS IN A USER INTERFACE

(75) Inventors: Sara Basson, White Plains, NY (US); Alexander Faisman, Croton-On-Hudson, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 10/838,444

(22) Filed: May 4, 2004

(65) Prior Publication Data

US 2005/0251746 A1  Nov. 10, 2005

(51) Int. Cl.
*G06F 3/00* (2006.01)
*G06F 9/00* (2006.01)
*G06F 17/00* (2006.01)
(52) U.S. Cl. .................. 715/762; 715/763; 715/760
(58) Field of Classification Search ............... 715/701, 715/702, 703, 753, 757, 758, 773, 850, 865, 715/863, 727, 760, 762, 763, 764
See application file for complete search history.

(56) References Cited

U.S. PATENT DOCUMENTS

| 5,265,014 | A | * | 11/1993 | Haddock et al. ................ 704/9 |
| 5,748,974 | A | * | 5/1998 | Johnson .......................... 704/9 |
| 5,825,356 | A | | 10/1998 | Habib et al. ................. 345/338 |
| 5,877,750 | A | | 3/1999 | Hanson ....................... 345/173 |
| 5,953,541 | A | * | 9/1999 | King et al. ..................... 710/67 |
| 6,333,752 | B1 | | 12/2001 | Hasegawa et al. ........... 345/768 |
| 6,333,753 | B1 | * | 12/2001 | Hinckley .................... 715/768 |
| 6,484,094 | B1 | | 11/2002 | Wako .......................... 701/211 |
| 6,587,818 | B2 | | 7/2003 | Kanevsky et al. ........... 704/251 |
| 6,779,060 | B1 | * | 8/2004 | Azvine et al. ................. 710/65 |
| 6,964,023 | B2 | * | 11/2005 | Maes et al. .................. 715/811 |
| 2004/0193428 | A1 | * | 9/2004 | Fruchter et al. ............. 704/276 |
| 2004/0263487 | A1 | * | 12/2004 | Mayoraz et al. ............. 345/173 |

OTHER PUBLICATIONS

Bier, Stone, Pier, Buxton, and DeRose, Toolglass and Magic Lenses: The See Through Interface, http://www2.parc.com/istl/projects/MagicLenses/93Siggraph.htm.
Bier, Stone, Fishkin, Buxton, Baudel, A Taxonomy of See-Through Tools; http://www2.parc.com/istl/projects/MagicLenses/Taxonomy.
K. Hinckley, M. Czerwinski, M. Sinclair, Interaction and Modeling Techniques for Desktop Two-Handed Input; Proceedings of the ACM UIST'98, Symposium on User Interface Software and Technology, p. 49-58.

(Continued)

*Primary Examiner*—Tadesse Hailu
*Assistant Examiner*—Anita D Chaudhuri
(74) *Attorney, Agent, or Firm*—John R. Pivnichny; Law Office of Jim Boice (57) ABSTRACT

Resolving an ambiguous input. When an ambiguous user input is received, the user input is displayed, for example, in a way that either the ambiguity is resolved or the ambiguity is indicated to the user by unique and distinctive graphical indications. Then, after waiting either for a time to receive a corrective input from the user or for a predetermined time, the display of the user input is faded.

33 Claims, 8 Drawing Sheets

OTHER PUBLICATIONS

Buxton, Fitzmaurice, Balakrishnan, and Kurtenbach; Large Displays In Automotive Design; IEEE Graphics and Applications (Jul./Aug. 2000), on. 68-75.

Landragin, The Role of Gesture In Multimodal Referring Actions, Proceedings of the Fourth IEEE Conference On Multimodal Interfaces, (ICMI'02), 0-7695-1834-6/02.

On-Line Vending Machine and Catalog Product Icons, IBM Technical Disclosure Bulletin, vol. 38., No. 04, Aug. 1995, pp. 113-115.

SM Button ActiveX, http://www.station-media.com/smbutton.

SM Button, http://www.newfreeware.com/development/419.

Mountfocus Keyboard Design, http://www.newfreeware.com/utils/663.

* cited by examiner

METHOD AND PROGRAM PRODUCT FOR RESOLVING AMBIGUITIES THROUGH FADING MARKS IN A USER INTERFACE

BACKGROUND

1. Technical Field

Our invention relates to a system, method, and program product where a user interaction is interpreted and used by a computer system to interactively access assistance and information, where the assistance and information is provided according to input ambiguity. The input ambiguity is determined by one or more of current conditions, requested operations, the location of a tactile impulse or cursor, or the contents of an audible input. The ambiguity may be resolved by initiating the resolved requested action, presenting help screens or menus to the user, warning the user, or reminding the user to take an action.

2. Background Art

Multimodal interfaces are becoming increasingly popular in many areas. Multimodal interfaces are finding utility in global positioning satellite navigation systems, diagnostic systems for automobiles, distance learning, web browsing, voting, and machine and process control. One characteristic of multimodal interfaces is the recognition and interpretation of multimodal user inputs, such as audible inputs and tactile inputs.

One problem that arises with touchscreens is the absence of any tactile feedback; the "click" as the uses presses a "virtual button." Heretofore, visual representations have been provided as a response to pressing a "virtual button." These responses have included changes in color, changes in size or shape, changes in brightness, and blinking and flashing.

Another problem of multimodal interfaces is the proliferation of ubiquitous "Help Screens" and especially anthropomorphic figures frequently associated with "Help Screens."

A further problem with tactile multimodal interfaces is how to deal with ambiguous user actions and recognition of complex (and potentially ambiguous) user actions. One solution, described, for example, in U.S. Pat. No. 6,587,818 to Kanevsky et al. for System And Method For Resolving Decoding Ambiguity Via Dialog, interrupts the process and asks the user questions. However, this method is not altogether acceptable in multimodal applications. This is because many features can be simultaneously confusing, and many questions may be necessary to resolve the ambiguity. Thus, in this context, there is a need for an intuitive, non-intrusive and natural feedback to the user, and an equally user friendly method for the user to implement the computer's resolution of the ambiguity.

Similarly, in the situation such as arises in a Global Positioning Satellite System (GPSS) interface, where a user touches a touchscreen or clicks a mouse, and asks for directions from "Point A" to "Point B" ambiguity can arise because the system may not be able to determine exactly what the user pointed to. The same ambiguity can also arise in a voice recognition system, especially if the system is unsure what the user said. The problem can also become more acute if the user must identify a plurality of points, as in the query "What is the distance from Point A to Point B via Point C?", or where there the user is potentially distracted, as in programming or interrogating a Global Positioning Satellite navigation system while driving. Thus, a clear need also exists to provide user-friendly feedback to an ambiguous entry by a distracted user.

The existing graphical user interfaces are "tri modal" since they designed to be controlled by a keyboard and mouse, and the output is piped trough the monitor. From a user's perspective they are "bi modal." This is because the user typically interacts with the computer by using hands and vision. Users with vision disabilities may use text to speech or BRAIL system as a way to receive the computer output.

The usual set of GUI controls: static text, edit box, list box, check box, scrollbar, table, and views have evolved over years within the context of systems such as Motif, Mac OS, Windows, Linux and Web browsers such as NetScape, Mozilla and Internet Explorer. Most of these controls were adjusted to "tri modal" user interaction. The keyboard and mouse actions are transferred into GUI actions, when user can often can see how they being reinterpreted into the output stream, that is, highlights, selections, visual appearance of the windows, changed text and so on.

This gives rise to a continuous loop of user action— changed output. Correction, if needed is a natural part of the process. In this context the computer is constantly informing the user about its changed state, inexplicitly exposing the state to the user. The user in this situation has a naturally developed feeling about how well he or she was entering the new data, or, in some cases, how well the computer "understood" the user's intention.

This situation changes dramatically with introduction of speech. It has been reported that speech is a likely candidate to become a commonly used input modality. Now, keyboard-mouse input of the information is synchronous because in both cases it is being generated by hands using devices designed to create digital streams of key and mouse clicks. Adding speech immediately poses a few problems:

Speech recognition is inaccurate—and it is necessary to resolve recognition errors?

Speech and keyboard/mouse input (speech and hands input from user's perspective) are asynchronous by nature; and the issue is how to provide reasonable behavior in situations when the combination speech and hand input:

can be interpreted, can only be interpreted with ambiguity, can not be interpreted yet (the information is not complete, system is waiting for an additional input), or can not be interpreted at all (contradiction in the input data, the input data are incomplete, expiration of the original data or request).

SUMMARY OF THE INVENTION

According to the method, system, and program product described herein, when an ambiguous user input is received, the user input is displayed, typically uniquely displayed, that is, the user input is displayed in a way that either the ambiguity is resolved or the ambiguity is indicated to the user by unique and distinctive graphical indications. Then, after waiting either for a time to receive a corrective input from the user or for a predetermined time, the display of the user input is faded.

As used herein, the ambiguity may be in the user intention, or in the computer's interpretation of user input, and the resolution of ambiguity may be as simple and straight forward as increasing user perceptual satisfaction.

The system, method, and program product described herein receives and interprets a user input interaction. The ambiguity in the user input is identified by the system and thereafter interpreted and resolved and used by the computer system to the extent necessary to interactively access assistance and information. The system provides assistance or an intermediate output according to the nature and extent of input ambiguity. The input ambiguity is determined by one or more of current conditions, requested operations, the location of a tactile impulse or cursor, or the contents of an audible input.

The system resolves the ambiguity by resolving and initiating the requested action, or by presenting help screens or menus to the user, or by warning the user, or by reminding the user to take an action.

This is accomplished by the method, system, and program product described herein. The user interface requirements lead to architecture requirements. The architecture requirements lead to a clean role division between the modules, straight forward development, and reusability of the code and scalability in relation to tasks and modalities. The last requirement is worth to elaborate on.

The method, system, and program product described herein below provides an end user experience that is experienced when the end user uses a map on a touch screen device saying "Plot route from here (touch or point to or point in proximity to) to there (touch or point to or point in proximity to)." These actions may be asynchronous, where the "here" and later "there" touches are not necessarily located in the same point on the time scale as the surrounding words or other user inputs. According to our invention this input is responded to by reasonable output behavior.

There are many other possible requests and actions that the method, system, and program product described herein below also addresses. For example, "What is this (touch)?", "What is the largest city form those (few touches)?". The architecture allows introducing various requests while avoiding growing the complexity of the system

BRIEF DESCRIPTION OF THE DRAWINGS

The above features and advantages of the present invention will become more apparent through the following detailed description of a specific embodiment of the present invention, in conjunction with the drawings, in which.

DETAILED DESCRIPTION

According to the method, system, and program product described herein when an ambiguous user input is received, the user input is displayed, typically uniquely displayed, that is, the user input is displayed in a way that either the ambiguity is resolved or the ambiguity is indicated to the user by unique and distinctive graphical indications. Then, after waiting either for a time to receive a corrective input from the user or for a predetermined time, the display of the user input is faded.

The system, method, and program product described herein receives and interprets a user input interaction. The ambiguity in the user input is identified by the system and thereafter interpreted and resolved and used by the computer system to the extent necessary to interactively access assistance and information. The system provides assistance or an intermediate output according to the nature and extent of input ambiguity. The input ambiguity is determined by one or more of current conditions, requested operations, the location of a tactile impulse or cursor, or the contents of an audible input.

The system resolves the ambiguity by resolving and initiating the requested action, or by presenting help screens or menus to the user, or by warning the user, or by reminding the user to take an action.

The resolution of ambiguity may allow a user to interactively access assistance or information regarding an underlying application or operation. This assistance may be in the form of menus, opportunities for further user input, a metaphorical graphical image, or a help screen or page. The assistance or information provided may be adjusted and presented according to determined user proficiency or by current conditions, such as a warning or reminder to a user about an input event, or the position of a graphical location of a user controlled input tool, or a desired operation. By this expedient the user may be shown a pattern to follow in order to achieve a desired result.

Many usual examples of multimodal interaction involve simultaneous usage of "point and speak" including pointing with a head-mounted cursor or with eye movement or head movements. "I want to take this (touch)", "From here (touch) to there (touch)", "from Los Angeles to there (touch)". In these examples a user may touch the objects to select before, meanwhile or after speaking. Speech and touches can be distributed randomly across the time line, provided that they are not too far away in time. One can assume that the difference in time can be not more then, for example, 5 seconds, otherwise the speech and the touches/clicks may be considered irrelevant to each other. User experience time, however, is different from computer time. One time a user can speak and touch during a period of 4.75 seconds and be satisfied with the program's behavior, the next time he or she might delay half second more, and the behavior of the program will be different. Problems like the above will generate an unhappy user experience.

The idea is, when possible to give user interface hints as to how the computer is trying to solve the problem of collecting the required information and possibly solving the task. In that case the user will get some understanding of Objects: Stage, Requests, Touch;

Stage—contains Requests and Touches; and

Requests—where behavior differs by type.

Touches, and pointing in proximity to (but spaced from the touch screen) also have a lifespan and behavior, which can be indicated visually by fading marks The user inputs may be tactile (as a touch screen), a mouse pointer, eye, head, or body movements, or audible, and the output may be audio data or video data or both audio and video data, with audio as well as visual interaction between a user and an operator interface. This is the situation where an audio input is used to interact with the interface, as in a voice controlled GUI.

According to the method, system, and program product of our invention, a trace, that is, a glowing point or small circle, can be displayed where the user pointed a finger or mouse. The trace can glow, that is, remain illuminated, for a few seconds, and then disappear. This allows the user to check whether he or she indicated the right point on the screen. Similarly, auditory information can be presented to the user for confirmation, with prosodic changes (that is, changes in, for example, intonation with a rising or falling pitch pattern, stress with a change in where the main accent occurs, and rhythm including the grouping of words). The trace and the prosodic change is especially useful where the user's ability to touch a specific precise point on a touch screen is compromised.

In the case of a fading visual mark, a distracted user, such as a driver entering or retrieving information from a Global Positioning Satellite Navigation Terminal or an Automotive Data Bus Terminal, can attempt an entry and continue driving. The entry remains on the screen and the screen does not immediately advance to the next screen. Instead, the entry remains bright, and then, after a time interval, fades before the screen advances to the next screen. There are two modes of operation that may be user selectable. In one alternative, the entry remains on the screen, and the screen does not advance until the user confirms the entry. Alternatively, the entry remains on the screen and the screen does not advance for a preset time to allow the user to correct an erroneous or ambiguous entry.

In a further exemplification the user can simultaneously point to two locations on a screen displayed map, wait for confirmation, such as a fading circle, and then enter a question or query, such as "What is the fastest route" or "what is the most direct route" or "how can I go from A to B via C?"

The color or brightness of marker can indicate the confidence level in the user's entry, especially an audible entry. Thus, a marker, as a circle, can be red for high confidence or pink for lower confidence. When an indication of lower confidence is presented, the user is given the opportunity to confirm or re-enter the entry.

In a further example of the invention, the visual confirmation of the tactile information provides memory enhancement and reinforcement. This is particularly important for users who are performing multiple tasks or who have cognitive or memory loss. The duration of the visual confirmation can be a function of prior knowledge about the user's attention span.

Operational Details

Figure 1:
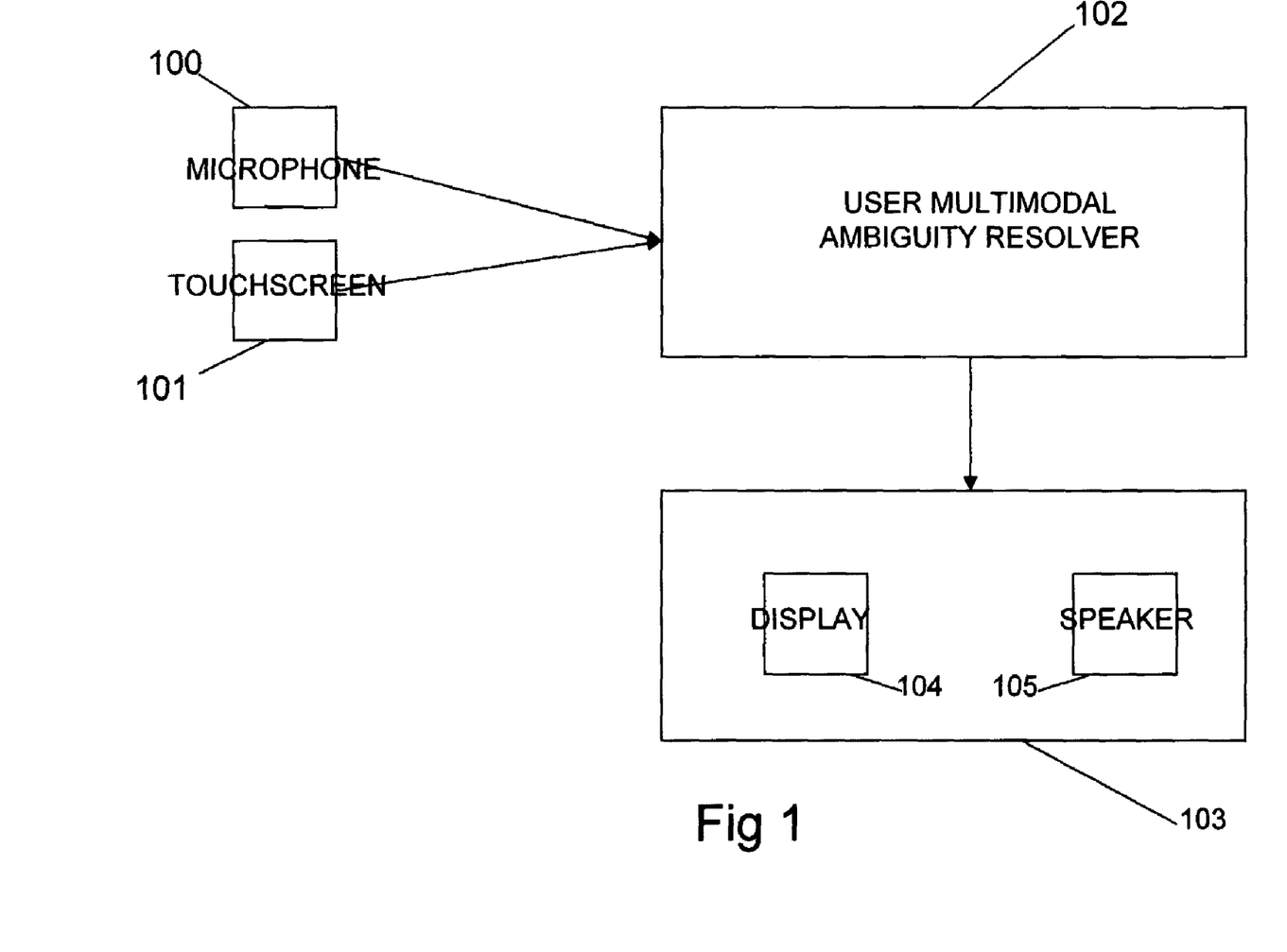
FIG. 1 illustrates the sensors that receive multimodal input, for example, a microphone and touch screen, although a camera or head mounted point or camera or the like could also provide multimodal input. Also shown is an associated multimodal ambiguity resolver, and output elements as a display and a speaker.

FIG. 1 illustrates sensors that can receive multimodal input, for example, a microphone 100, and a touch screen 101. While a microphone and touch screen are illustrated, it is to be understood that the multimodal input may be gestures including pointing short of a touch, a headset mouse pointer that moves a screen cursor on the screen as a function of head movement, eye gestures or movements, and the input sensors may be cameras, image capture devices, motion detectors, proximity detectors, and the like. In the case of audible inputs, the inputs may be voice, speech reading, even something as simple as clicking of teeth, The multimodal input enters block 102, the user multimodal ambiguity resolver. The ambiguity resolver 102 allows ambiguity in how a user enters input into the system and resolves the ambiguity. There are several possibilities for ambiguous input, the intentions of the user may represent one such possibility. For example, if the user touched a spot on the screen near a display point designating a city (A), but nearby is another city (B), it may be confusing for the system to recognize the input (city A or B) desired by the user.

Ambiguity may also exist when a system is trying to differentiate between multimodal inputs. For example, a user may touch a spot on a display screen and give the verbal command, "Show me this," intending for the system to display that which he selected on the touch screen. If the user selected some attraction, like a theme park, then the system must decide what to display about the theme park, a long list of details versus a brief summary of information on the rides. This is an illustrative example of when a system must decide on how to perceive the commands of multimodal input.

Ambiguity may also exist in how a computer interprets the intentions of a user. As a general rule computers must interpret user commands quite literally.

Ambiguity in computer action is illustrated in the following example. If a user gives the computer a verbal command and the computer must take some time to decode the user's command (several seconds), but the user does not understand why there is a delay in response The delay may be due to the computer decoding the initial command or the system searching for the relevant information requested by the user. Nevertheless, the user may incorrectly assume that the computer does not want to reply or has already replied (when in reality the computer is still preparing the response), and begin another command or repeat the previous command again. These extraneous commands may seriously distract or interrupt the computer processing creating yet another ambiguity. In short, there are many times during a human-computer interaction when there is a possibility for one to misunderstand the other due to ambiguous events.

A computer system should be capable of ensuring user satisfaction corresponding to the interaction occurring with the computer. For example, when a user touches a button, it is clear to the user that he/she has provided input and has executed a command because the button depresses. But, a user may not have the same feeling of satisfaction after having provided a tactile input on a touch screen. This is because the user did not perceive the command mechanism occurring as blatantly as it occurs with the depression of a button. This illustrates yet another example of potential ambiguity that may be result from the user interface.

Block 102, the user multimodal ambiguity resolver, assesses ambiguities, and depending on how it assesses ambiguities, it performs specific interactions with the user via Block 103 through either a display 104, or a speaker 105. A detailed description of the user multimodal ambiguity resolver is found in FIG. 2.

Figure 2:
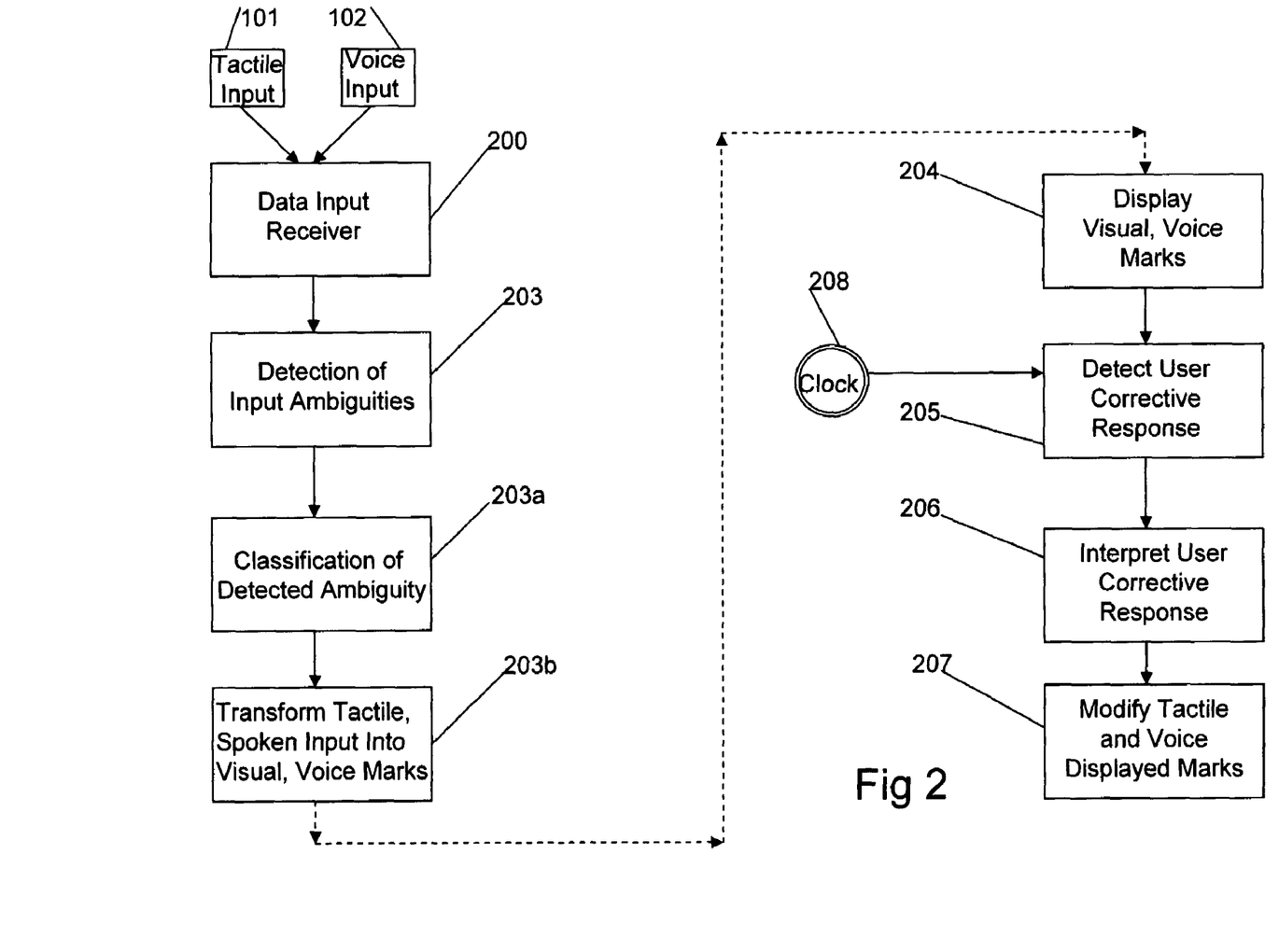
FIG. 2 illustrates a flow chart of the method, system, and program product of the invention.

In FIG. 2 modules 100 and 101 represent tactile and voice sensors, respectively. Module 200 represents the data input receiver that is responsible for receiving the multimodal data provided by the user. Module 203 detects if there is ambiguity of input, to be explained herein below. Once ambiguity has been detected, module 203a is responsible for classifying the type of ambiguity. There are four types of ambiguity—user intentions, computer interpretation of user intentions, user perceptions of computer actions, user satisfaction relating to the interaction with the computer. Once the ambiguity has been classified it enters module 203b.

Module 203b is a transformer of tactile/spoken input into visual/voice marks. The user receives feedback about his/her input so that he/she can better understand how his/her actions have affected the computer and how the computer is responding to the user's input.

Module 204 is a displayer of marks. The computer gives the user feedback via some method. For example, when the user touches the screen, the computer can display a small circle around the area touched by the user, which fades after some time. Another option is that the computer makes a beeping sound when the user touches the screen. Alternatively, a user may request directions from one city to another on a displayed map and the computer can encircle each city selected by the user, allowing the circles to fade as the directions become available.

Module 205 is the user corrective response detector. This module allows the user some period of time to recognize a potential error in their input and to change their request (for example, a user may have selected the wrong city and realizes this when the incorrect city is encircled, thereby allowing the user several seconds to select the correct city). This same module can function to alert the user to some other ambiguity in input allowing the user an opportunity to modify the ambiguity. The clocker 208 provides an allotted time frame for the user's corrective response. If the allotted time frame elapses without additional input from the user, the system understands that the user has accepted the displayed feedback to be a correct representation of initial input.

Module 206 is the user corrective response interpreter that functions to assess any corrective input provided by the user.

Module 207 is the modifier of tactile and voice displayed marks. This module functions to remove the displayed marks once the system understands that the user has no corrective response and is satisfied with the original input. On the other hand, this module may also enhance the markings to draw the user's attention to the selection.

Figure 3:
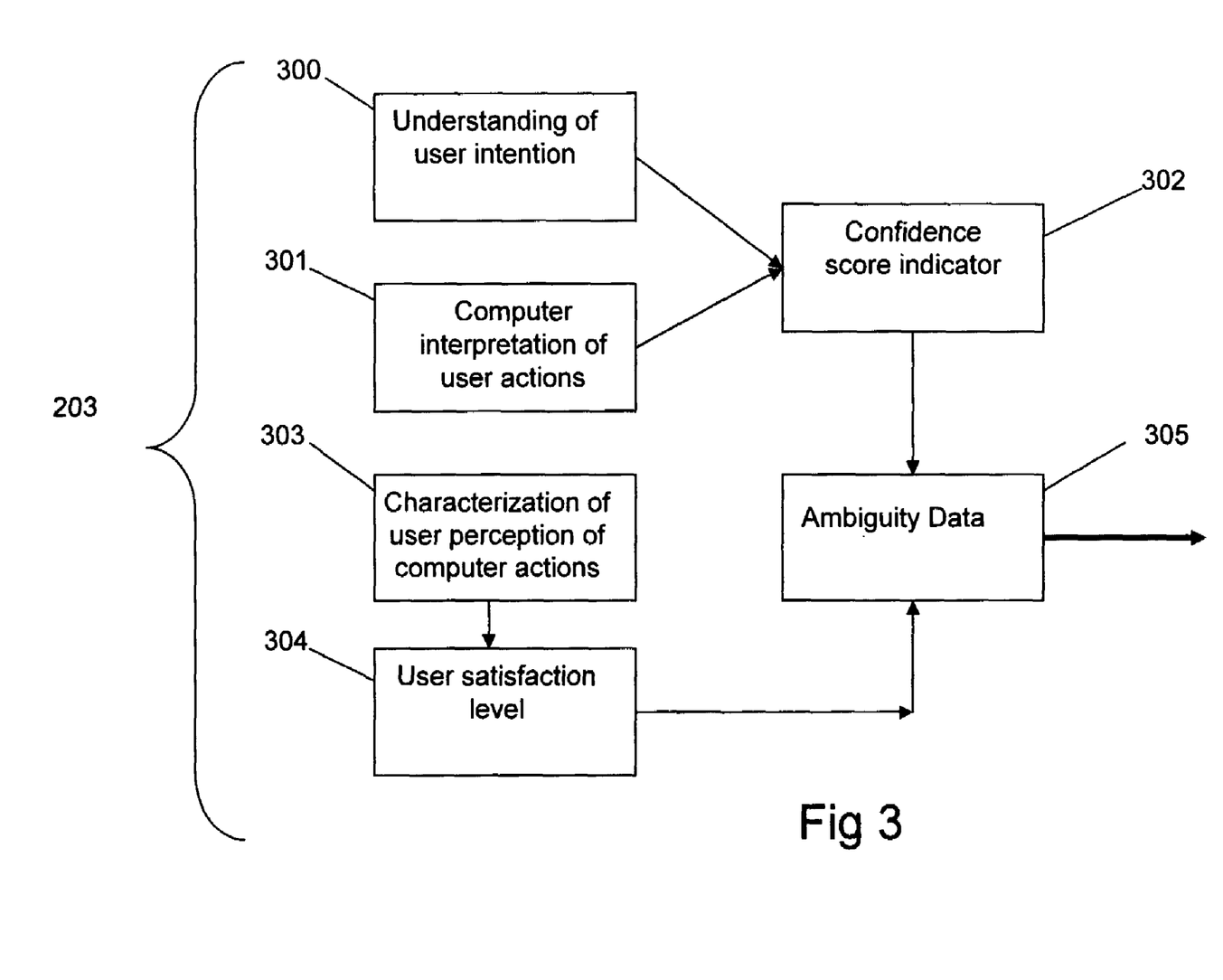
FIG. 3 illustrates a detailed flow chart of element 203 of FIG. 2 illustrating one example of detection of input ambiguities.

FIG. 3 illustrates module 203, the detector of input ambiguity. Module 300 represents the user's intention understanding. Module 301 is the computer interpreter of user actions. The user intention understanding module 300 may employ many methods to understand a user's intentions. For example, it may use semantic interpretation of user actions as shown in module 401 of FIG. 4.

Semantic interpretation of a user's intentions is known. For example, if a user touches two consecutive points on a display screen (i.e. two cities), the system makes the assumption that there is some connection between the two points—the user may want direction from one point to another, or the user may want some other information about the two points. Depending on the phrase used by the user, the system can understand the commands it receives via multimodal input. There are existing references on this subject. Similarly, the computer interpreter of user action 301 can utilize the semantic interpreter of user actions as shown in module 401 of FIG. 4. Module 302 represents the confidence score identifier that is connected to the semantic interpreter of user actions 401.

Module 303 characterizes user perceptions of computer actions. Typically, 303 utilizes a variety of user biometrics—voice, facial expressions, etc. that facilitates the understanding of a user's satisfaction based on vocal cues and facial expressions. This information enters module 304 responsible for assessing user satisfaction level.

All of this information from modules 300, 301, 302 and 304, is forwarded to module 305, as ambiguity data that is then sent to module 203a (FIG. 2) classifier of ambiguity.

Figure 4:
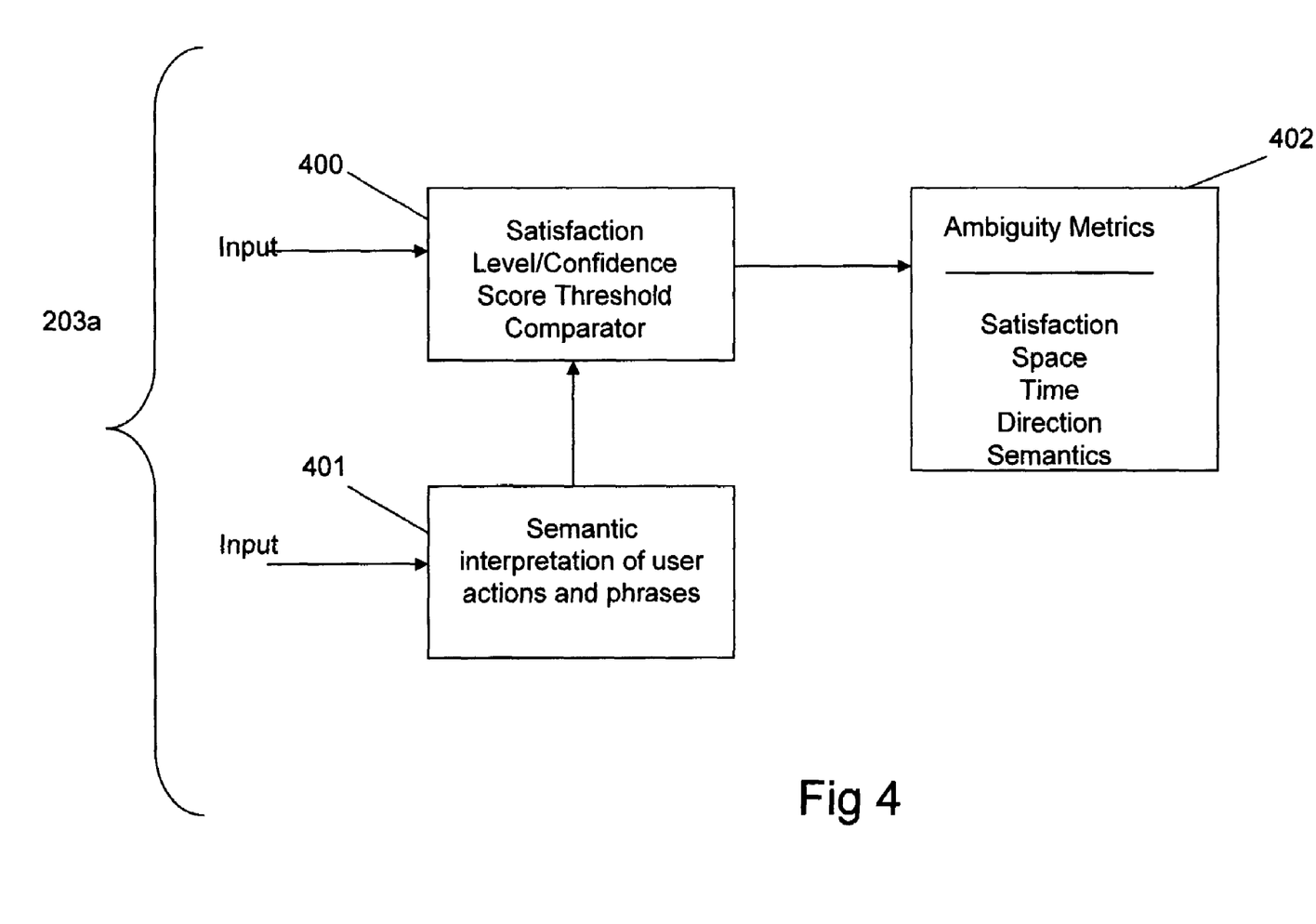
FIG. 4 illustrates a detailed flow chart of element 203a of FIG. 2 illustrating the method of classification of detected ambiguities.

FIG. 4 illustrates a method for classification of detected ambiguity, as illustrated in block 203a of FIG. 2. Module 400 contains a satisfaction level/confidence score and threshold comparator for different types of ambiguity data. This module compares the various data and sends it to module 402—ambiguity metrics. Module 402 utilizes ambiguity metrics (probability metrics) and some classification theory to classify the varying ambiguities according to—satisfaction, space (i.e. where the user pressed on the display screen), time (i.e. the user was unsure as to whether the system was still processing the initial request), direction (i.e. the direction of the user's gaze or user's position versus a command referring to another direction), semantic (from module 401). Module 401 provides a semantic interpretation of user actions and phrases to module 400.

Figure 5:
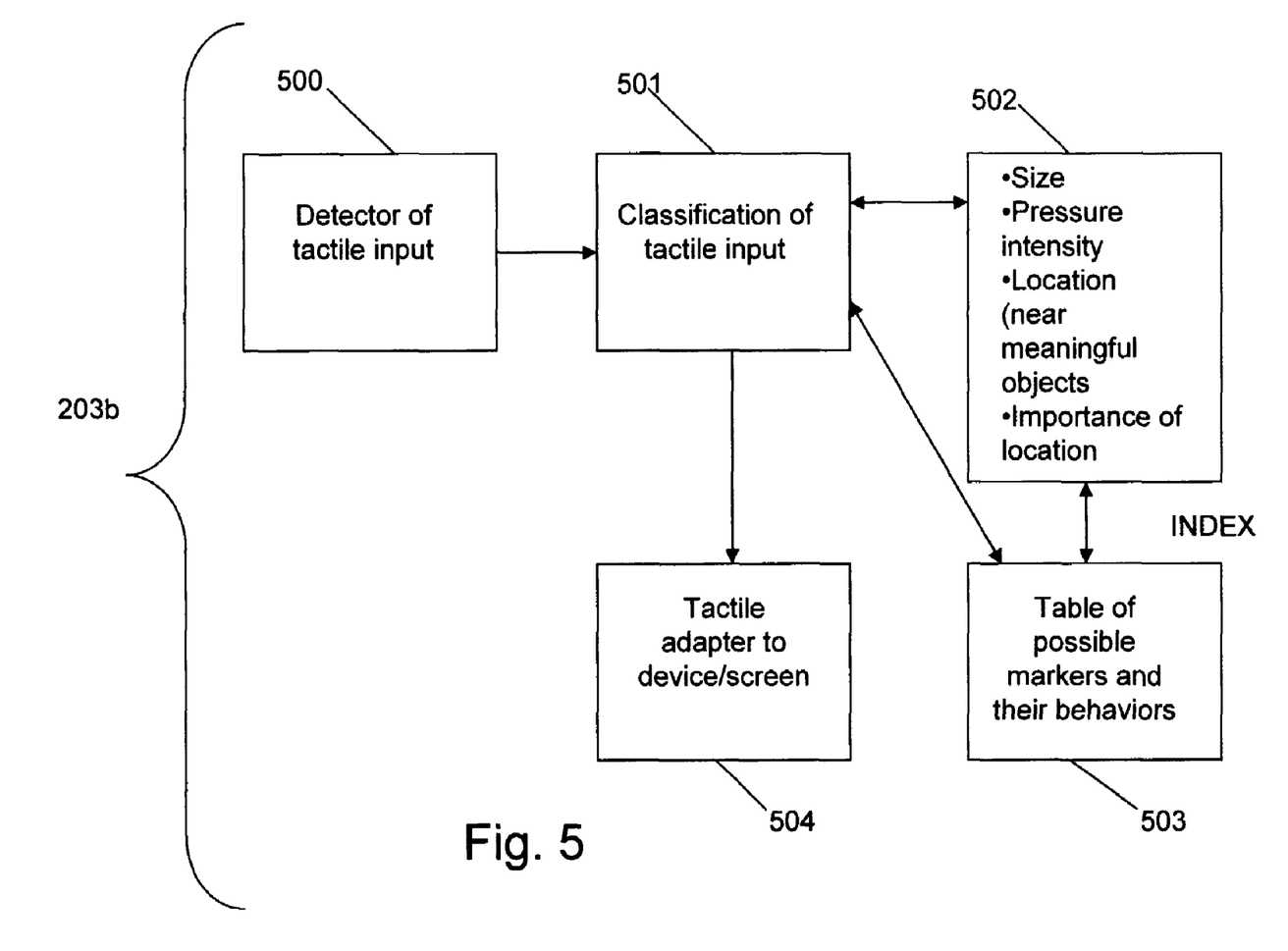
FIG. 5 illustrates a detailed flow chart of module 203b of FIG. 2 for transforming tactile and voice inputs into visual and voice marks.

FIG. 5 illustrates module 203b, which is the transformer of tactile/spoken input into visual/voice marks. Module 500 is a detector of tactile input. Module 501 is a classifier of tactile input. Tactile input is being used just as an example in this scenario, it may be replaced with other forms of input—i.e. voice. The classifier of tactile input 501 is connected to block 502.

Block 502 contains a variety of characteristics for tactile input—size, pressure intensity, time sequence (i.e. several consequent tactile inputs may result if a user selects several cities in a row), location near meaningful objects (where the tactile input was located on a map, for example, if it was near an important location, the system would prevent a mark from obscuring important information like the name of a City, the system would allow a semicircle instead of a full circle to depict the user's selection but not obscure other information.), information about user attention and satisfaction received from other modules as well as via camera feed. The system may recognize if the user's attention is slightly misdirected from the display and have the marker encircling the user's selection be pulsating, larger, and brighter, versus if the user is clearly focused on the display screen, the marker encircling the user's selection may be small and discrete.

The information from block 502 serves as an index for module 503, the Table of possible marks and their behaviors. Depending on different information about the user, his behavior, semantic objects, and how the computer understands the user's posture and satisfaction, the system will decide how the marks should be displayed (i.e. circle, square, small, large, pulsating, static, bright, dull, etc.). This information enters the classifier of tactile input 501, which then forwards its output to module 504 (204) the graphical adapter to device/screen. Depending on the modality of display that is being utilized by the system (i.e. PDA versus laptop versus desktop versus cellular phone), the graphical adapter presents the appropriate display with the correct graphic data to the user's satisfaction.

Figure 6:
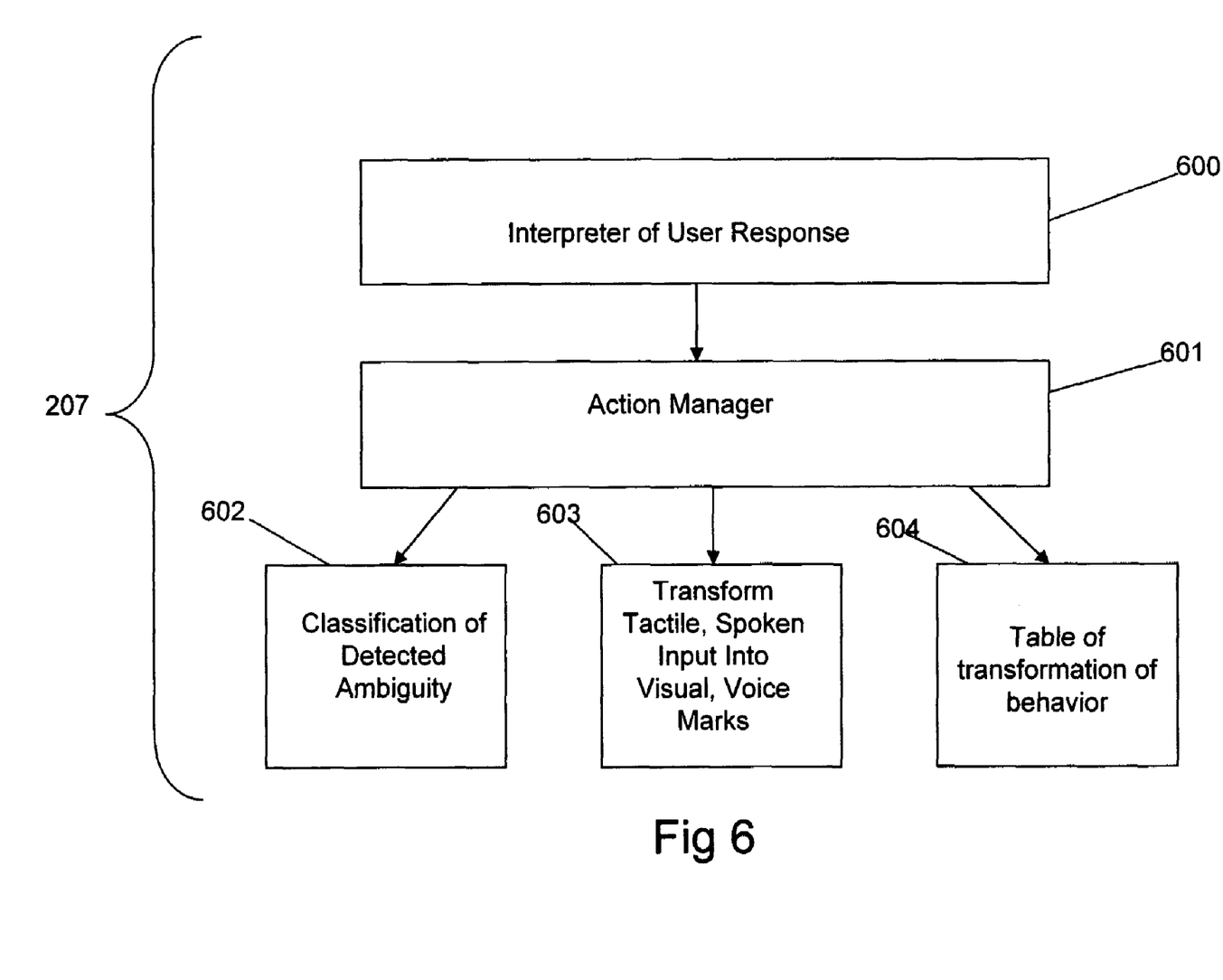
FIG. 6 illustrates a detailed flow chart of module 207 of FIG. 2 for modifying and displaying tactile and voice marks.

FIG. 6 illustrates module 207, which is the modifier of tactile/voice displayed marks.

Module 600 interprets user response. The system must understand the user's reaction to the displayed tactile marks—Has the user noticed the displayed marks? Has the user made any corrections once he saw that the original selection he made was incorrect? Has the user repeated tactile input? Has the user provided tactile input in another location? Depending on how module 600 interprets the user's response, the action manager 601 decides the next course of action for the system.

The action manager may again connect to 602 (203a) where the ambiguities are classified, to 603 (203b) where new tactile or spoken input is transformed, or to 604 that is a table of transformation of behaviors that indicate how the system should react to various user responses (i.e. display a new mark, stop the program, continue the program, etc.).

Figure 7:
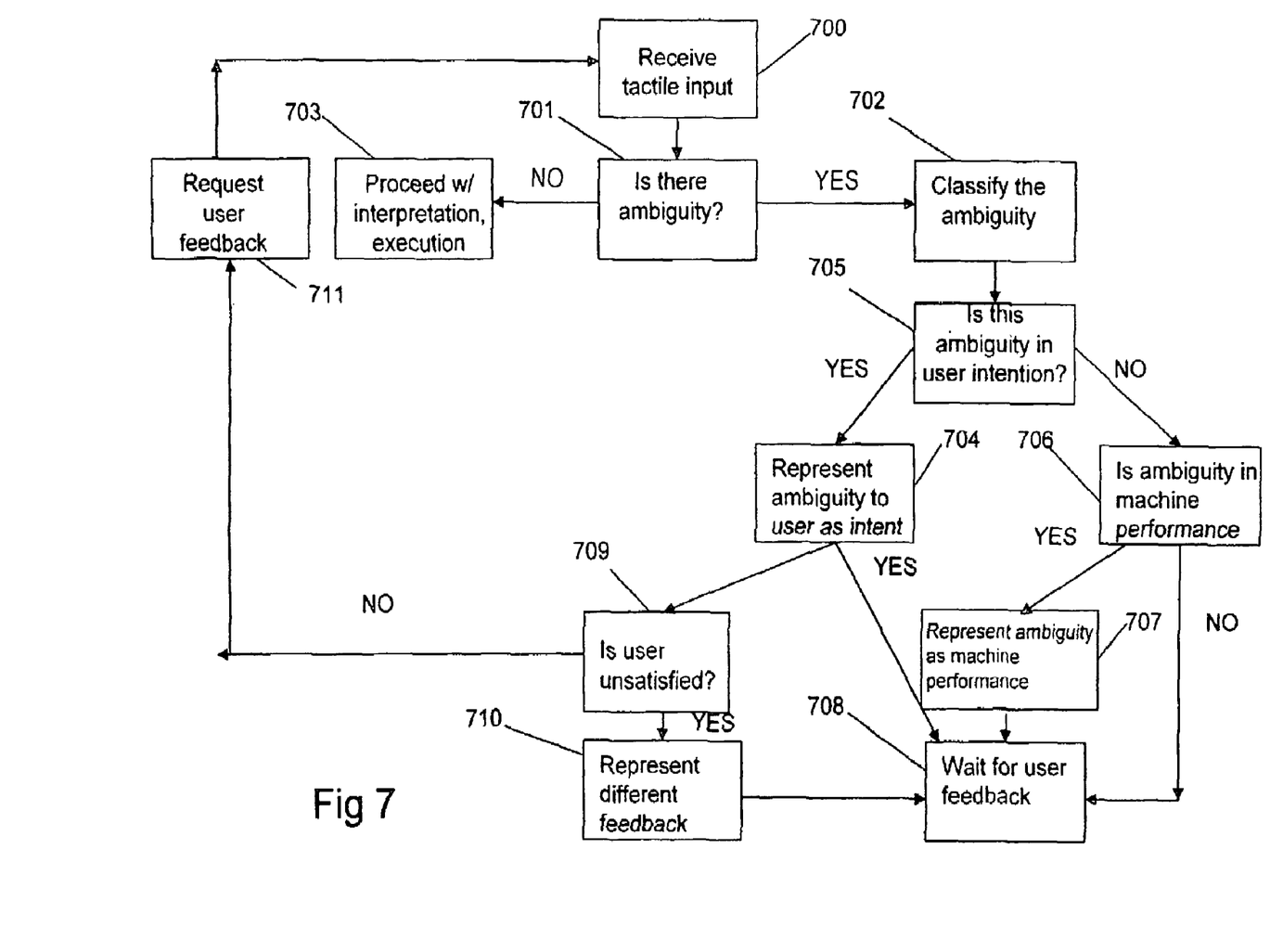
FIG. 7 illustrates a detailed flow chart of one example of the methodology of the method, system, and program product of the invention.

FIG. 7 illustrates the basic methodology of the invention. Module 701 receives tactile input. Module 701 determines if there is any ambiguity in the user's input. If no, 703, then the system proceeds with interpretation and execution of the user's command(s). If yes, 702, then the system must classify the ambiguity—Is this ambiguity in the user's intention 705? If yes, 704, then bring the ambiguity to the user's attention. If no, 706, is this ambiguity in the machine's performance? If yes, 707, then represent ambiguity to the user as machine performance. If no, 709, is the user unsatisfied? If yes, 710, then represent different feedback. Modules 710, 704 and 707 are all connected to module 708 that waits for the user's feedback. Module 709, is the user unsatisfied, is connected to module 711 that asks the user for more feedback. The system then repeats the cycle again by receiving tactile or voice input.

Figure 8:
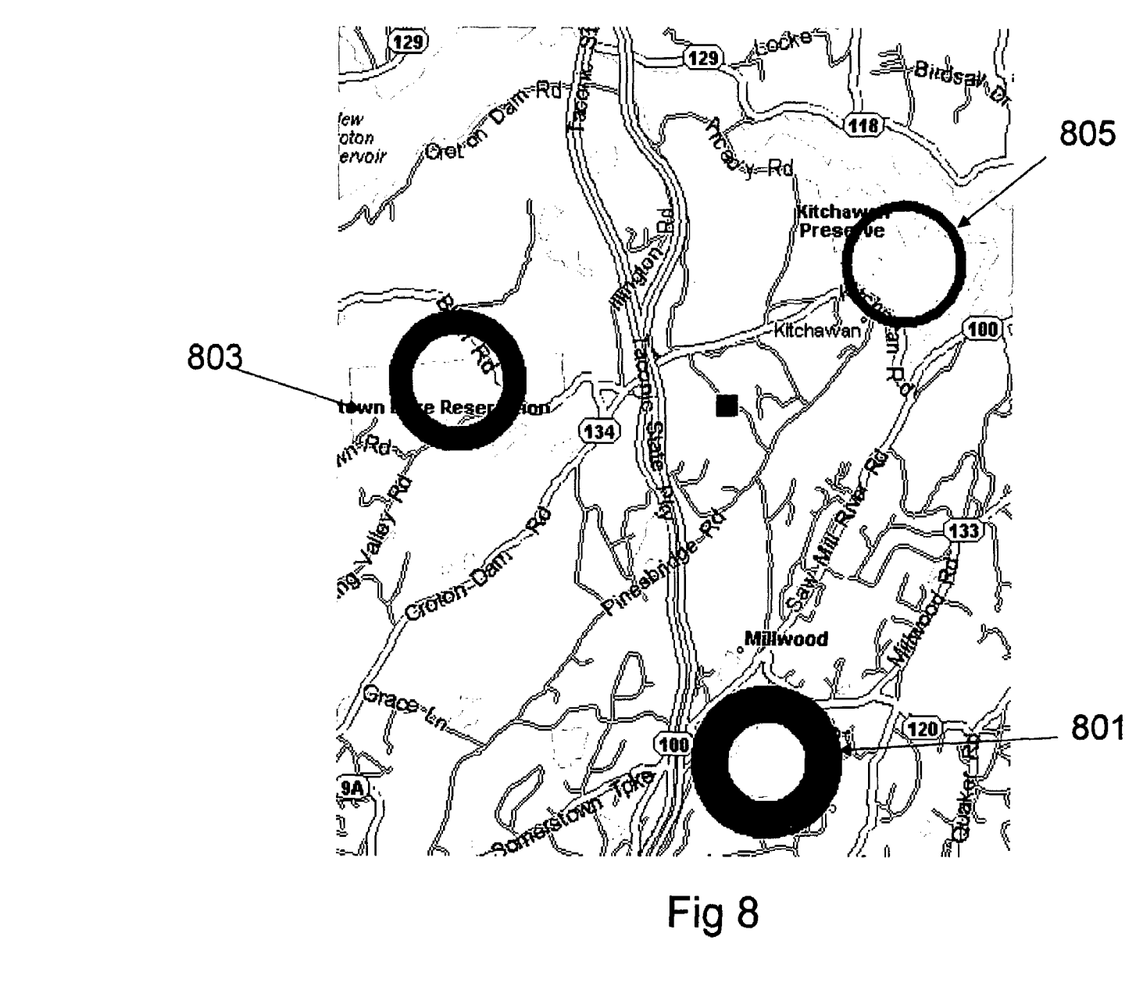
FIG. 8 illustrates one example of the invention where circles indicate where the user touched a screen in a sequence. The circles fade or disappear, and therefore their wideness decreases in sequence.

FIG. 8 illustrates one example of the invention. As shown in the Figure the circles are illustrated with decreasing circumference line thickness. This may indicate where the user has touched a screen in a sequence. The circles fade or disappear, and therefore their wideness decreases in sequence.

Overall, in practicing the method, system, and program product of our invention, the tactile input means is typically chosen from the group consisting of a touch screen sensor or a mouse pointer, where the user's tactile input is touching a mouse, or display. Subsequently, the method, system, and program product displays the user interactions. That is, when the user first touches the mouse or the touch screen, the computer reveals the mouse cursor and performs a quick animation of a radius circle collapsing on the mouse cursor position.

The quick animation of the radius circle helps to direct the user's attention to the focus of interaction, that is, when the user grabs or releases mouse or touches or pulls away from the touch screen. One illustration of this quick animation is stretching the map with a mouse or touch. A user first positions the cursor around an area of interest, where clicking and dragging the mouse and touchpad stretches the map. In this regard a dragging rectangle helps to show the area of the map that has been "grabbed." When the user releases the mouse button, the map updates, filling in additional detail. The map fades in some period of animation to reduce any visual discontinuities.

When deistic gestures are produced on a touch screen, they can take forms that can lead to several sorts of ambiguities. Considering that the resolution of a multimodal reference requires the identification of the referents and the context ("reference domain") from which these referents are extracted, that is, linguistics, gestures, and visual clues, the dialogue system may expand to comprehend the referring intention.

That is, the system may explore the links between words, gestures and perceptual groups, doing so in terms of the clues that delimits the reference domain. This involves taking the domain into account for dialogue management, for the comprehension of further utterances, especially when the subsequent utterances seem to implicitly use a pre-existing restriction to a subset of objects. This provides a strategy of multimodal reference resolution based on the notion of reference domain with extraction of the referring situations. This resolution of ambiguity is a function of referential gestures, with integration of speech and gesture and referent and context identification.

In a preferred example, a method, system, and program product is provided for implementing an on-demand user interface. The interface uses at least one input device capable of detecting touch. A sensed touch transition reflective of a user then making or breaking contact with the device, such by touching the device with a finger of a non-preferred hand or lifting his(her) finger from the device, causes a sheet or screen to be displayed or dismissed. To prevent user distraction, these detected transitions preferably initiate corresponding predefined animation sequences that occur over preset time intervals in which the display, for example, a Tool Glass sheet, either begins to fade into view as soon as user contact begins and then begins to fade out from view as soon as user contact ends. Such touch sensing can readily be used to provide "on-demand" display and dismissal of substantially any display widget, e.g., a toolbar, based on sensed contact between each hand of a user and a corresponding input device, such as between a preferred hand and a touch sensitive mouse. Through use of this interface, display clutter can be reduced and displayed application screen area increased at appropriate times during program execution consistent with user action and without imposing any significant cognitive burden on the user to do so; thereby, advantageously improving a "user experience".

Program Product

The invention may be implemented, for example, by having the display application as a software application (as an operating system element), a dedicated processor, or a dedicated processor with dedicated code. The computer, including its graphical user interface and user input/output applications, executes a sequence of machine-readable instructions, which can also be referred to as code. These instructions may reside in various types of signal-bearing media. In this respect, one aspect of the present invention concerns a program product, comprising a signal-bearing media tangibly embodying a program of machine-readable instructions executable by a digital processing apparatus to perform the steps of receiving user inputs, either by touch screen, audible inputs, or pointers, identifying actual and potential ambiguities, indicating these actual and potential ambiguities to an end user, and after allowing the user time to resolve the ambiguities fading the indications associated with the ambiguities.

This signal-bearing medium may comprise, for example, memory in server. The memory in the server may be nonvolatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable storage media. As an example, the machine-readable instructions may comprise software object code, compiled from a language such as "C++".

Additionally, the program code may, for example, be compressed, encrypted, or both, and may include executable files, script files and wizards for installation, as in Zip files and cab files.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A computer-implemented method of resolving an ambiguous input to a computer system, said computer-implemented method comprising:

programming a specific processor with computer executable instructions that, when executed within the computer system, execute steps comprising:

receiving a user tactile input that has been input by a user on a display screen, wherein said user tactile input is an ambiguous input due to an imprecise location of the user tactile input on a display monitor;

in response to receiving said ambiguous input, displaying said ambiguous input to said user in a way that indicates an ambiguity of said ambiguous input to the user by graphical means;

in response to displaying said ambiguous input in a way that indicates the ambiguity of said ambiguous input to the user by graphical means, waiting a predetermined period of time to receive a corrective input from the user; and fading a display of the ambiguous input during said predetermined period of time, wherein said fading occurs gradually during said predetermined period of time, wherein said ambiguous input is displayed as a geometric shape having an initial thickness, and wherein the initial thickness of the geometric shape decreases during said predetermined period of time.

2. The computer-implemented method of claim 1, further comprising:

in response to the display of the ambiguous input completely fading away, replacing a first screen being displayed on the display monitor with a second screen.

3. The computer-implemented method of claim 2, wherein the second screen is presented automatically after a preset period of time.

4. The computer-implemented method of claim 2, wherein the second screen is presented only after the user confirms an entry on the first screen.

5. The computer-implemented method of claim 1, wherein the ambiguity is detected, by the computer system, in response to the user failing to look at a location of the user tactile input on the display monitor while entering the user tactile input.

6. The computer-implemented method of claim 1, wherein said ambiguous input is a tactile input onto a touch screen, and wherein a display of the tactile input is brightness coded to identify a level of user confidence that an initial tactile input is correct.

7. A computer system for resolving input ambiguity comprising:

a central processing unit (CPU), a computer readable memory, and a computer readable storage media;

first program instructions for receiving a user tactile input that has been input by a user on a display screen, wherein said user tactile input is an ambiguous input due to an imprecise location of the user tactile input on a display monitor;

second program instructions for, in response to receiving said ambiguous input, displaying said ambiguous input to said user in a way that indicates an ambiguity of said ambiguous input to the user by graphical means;

third program instructions for, in response to displaying said ambiguous input in a way that indicates the ambiguity of said ambiguous input to the user by graphical means, waiting a predetermined period of time to receive a corrective input from the user; and fourth program instructions for fading a display of the ambiguous input during said predetermined period of time, wherein said fading occurs gradually during said predetermined period of time, wherein said ambiguous input is displayed as a geometric shape having a initial thickness, and wherein the initial thickness of the geometric shape decreases during said predetermined period of time, and wherein said first, second, third and fourth program instructions are stored on said computer readable storage media for execution by said CPU via said computer readable memory.

8. The computer system of claim 7, wherein the ambiguous input is chosen from a group consisting of touch, gestures, head mounted mouse movements, eye movements, voice, and voice intonations.

9. The computer system of claim 7, wherein an ambiguity of said ambiguous input is from a group consisting of all of:
ambiguity in a user intention,
ambiguity in interpretation of a user intention,
ambiguity in user interpretation of computer actions,
ambiguity in user perception of computer actions, and
user perceptual dissatisfaction in interactions between the user and the computer system.

10. The computer system of claim 7, wherein displaying said ambiguous input comprises either resolving said ambiguity or indicating an unresolved ambiguity.

11. The computer system of claim 10 adapted to indicate said ambiguity to the user by a graphical output.

12. The computer system of claim 7, wherein the ambiguous input is a tactile input chosen from a group consisting of a touch screen sensor, a mouse pointer, and a head mounted mouse pointer.

13. The computer system of claim 12, wherein when the user applies a tactile input, the system causes a circle that is surrounding a cursor to collapse onto a current cursor position.

14. The computer system of claim 13, wherein when the user positions the cursor around an area of interest and clicks a tactile input drag button while dragging the tactile input, wherein the system displays a rectangle, and wherein said user's dragging of the rectangle indicates the area of interest that has been grabbed and dragged.

15. The computer system of claim 14, wherein when the user releases the tactile input drag button, the system updates the display screen by filling in additional detail.

16. The computer system of claim 15, wherein the system fades the rectangle.

17. The computer system of claim 7, wherein a duration of pausing processing of the user tactile input to receive a corrective user input is a function of different multimodal input events.

18. The computer system of claim 7, wherein the computer system resolves user intention ambiguities in multimodal actions based upon time delays between user input multimodal events.

19. The computer system of claim 7 adapted for geographic use, wherein sequence of and time intervals between subsequent user input events result in a display of different location sequences.

20. A tangible data storage medium on which is stored a program product, said program product comprising computer readable code, said computer readable code configuring and directing a computer to perform a method for resolving an ambiguous multimodal input to a computer system, said method comprising:

receiving an ambiguous multimodal input from a user;
determining that the geometric shape obscures pre-determined important information on a graphical display;
in response to determining that the geometric shape obscures the pre-determined important information on the graphical display, replacing the geometric shape with another type of geometric shape that does not obscure the pre-determined important information on the graphical display;

in response to receiving said ambiguous multimodal input, displaying the ambiguous multimodal input to said user on the graphical display as a geometric shape;

in response to displaying said ambiguous multimodal input, pausing processing the ambiguous multimodal input to receive a corrective user input; and in response to receiving a corrective user input, fading the display of said ambiguous multimodal input from said graphical display over a predetermined length of time wherein said fading occurs gradually over said predetermined period of time.

21. The tangible data storage medium of claim 20, wherein the ambiguous multimodal input is chosen from a group consisting of touch, gestures, a mouse pointer, a head mounted mouse pointer, eye movements, voice, and voice intonations.

22. The tangible data storage medium of claim 20, wherein an ambiguity of said ambiguous multimodal input is chosen from a group consisting of one or more of:
ambiguity in a user intention;
ambiguity in interpretation of a user intention;
ambiguity in user interpretation of computer actions;
ambiguity in user perception of computer actions; and
user perceptual dissatisfaction in interactions between the user and the computer system.

23. The tangible data storage medium of claim 20 adapted for displaying said ambiguous multimodal input and either resolving ambiguity or indicating unresolved ambiguity.

24. The tangible data storage medium of claim 23 adapted for graphically indicating ambiguity to the user.

25. The tangible data storage medium of claim 20 adapted for indicating ambiguity to the user by fading a display of a mark in response to receiving a corrective response from said user.

26. The tangible data storage medium of claim 20 wherein input means are chosen from a group consisting of a touch screen sensor, a mouse pointer, and a head mounted mouse pointer.

27. The tangible data storage medium of claim 26 adapted for receiving a user tactile input, displaying a cursor and a circle associated with the cursor in response thereto, and collapsing the circle on a current cursor position.

28. The tangible data storage medium of claim 27 adapted for the user positioning the cursor around an area of interest and clicking a tactile drag button while dragging the tactile input, and thereafter displaying a rectangle, wherein said user's dragging of the rectangle indicates the area of interest that has been grabbed and dragged.

29. The tangible data storage medium of claim 28 adapted for updating the graphical display when the user releases the tactile input drag button.

30. The tangible data storage medium of claim 29 adapted for fading the rectangle.

31. The tangible data storage medium of claim 20 adapted for pausing the ambiguous multimodal input to receive a corrective user input as a function of different multimodal input events.

32. The tangible data storage medium of claim 20 adapted for generating a corrective input in the absence of a user reply.

33. The tangible data storage medium of claim 20 adapted for resolving user intention ambiguities in multimodal actions based upon time delays between user input multimodal events.

* * * * *